(12) United States Patent
Sai

(10) Patent No.: US 7,891,229 B2
(45) Date of Patent: Feb. 22, 2011

(54) METHOD AND APPARATUS FOR REAL-TIME CALIBRATION OF A LIQUID STORAGE TANK LEVEL GAUGE

(75) Inventor: Bin Sai, Zuid Holland (NL)

(73) Assignee: Enraf B.V., Delft (NL)

( * ) Notice: Subject to any disclaimer, the term of this patent is extended or adjusted under 35 U.S.C. 154(b) by 449 days.

(21) Appl. No.: 12/119,957

(22) Filed: May 13, 2008

(65) Prior Publication Data

US 2009/0282892 A1 Nov. 19, 2009

(51) Int. Cl.
  *G01F 19/00* (2006.01)
(52) U.S. Cl. .................... 73/1.73; 73/290 V
(58) Field of Classification Search ............ 73/1.73
  See application file for complete search history.

(56) References Cited

U.S. PATENT DOCUMENTS

| | | | |
|---|---|---|---|
| 3,933,030 A | | 1/1976 | Forster et al. |
| 5,095,748 A | * | 3/1992 | Gregory et al. ........... 73/290 V |
| 5,121,340 A | * | 6/1992 | Campbell et al. ............ 702/54 |
| 5,406,842 A | | 4/1995 | Locke |
| 5,442,359 A | | 8/1995 | Rubin |
| 5,774,089 A | | 6/1998 | Bamler et al. |
| 6,629,458 B1 | | 10/2003 | Westerling et al. |
| 6,923,057 B2 | | 8/2005 | Sabatino |
| 2003/0167839 A1 | | 9/2003 | Burger et al. |
| 2004/0196177 A1 | | 10/2004 | Billington et al. |
| 2005/0190098 A1 | | 9/2005 | Bridgelall et al. |
| 2006/0225499 A1 | | 10/2006 | Gravel et al. |
| 2007/0169549 A1 | | 7/2007 | Kwun et al. |
| 2007/0236385 A1 | | 10/2007 | Kleman et al. |

(Continued)

FOREIGN PATENT DOCUMENTS

DE 100 40 180 A1 4/2002

(Continued)

OTHER PUBLICATIONS

International Standard, Petroleum and liquid petroleum products-Measurement of level and temperature in storage tanks by automatic methods, Part 3: Measurement of level in pressurized storage tanks (non-refrigerated), 1st Edition, Nov. 15, 2002, 21 pages.

(Continued)

*Primary Examiner*—Hezron Williams
*Assistant Examiner*—Rodney T Frank
(74) *Attorney, Agent, or Firm*—Munck Carter, LLP

(57) ABSTRACT

A system and method are provided that receive a signal representing a reflection of an electromagnetic wave from a liquid and from one or more reference pins in a storage tank. A sensed distance to the liquid and one or more sensed distances to the pins are calculated from the signal, and the sensed distances to the pins are compared to one or more reference distances. A correction factor is calculated based on the comparison of the sensed distances and the reference distances, and a corrected distance to the liquid is calculated based on the correction factor and the sensed distance to the liquid. While the storage tank is empty, a reference signal representing a reflection of an electromagnetic wave from the reference pins may be obtained and reference sensed distances to the reference pins calculated and stored as the reference distances.

21 Claims, 5 Drawing Sheets

U.S. PATENT DOCUMENTS

2010/0070208 A1    3/2010  Sai

FOREIGN PATENT DOCUMENTS

| NL | 1032192 | 7/2006 |
|---|---|---|
| WO | WO 93/12408 A1 | 6/1993 |
| WO | WO 2004/053521 A1 | 6/2004 |
| WO | WO 2007/053007 A1 | 5/2007 |
| WO | WO 2007/111498 A2 | 10/2007 |

OTHER PUBLICATIONS

A. A. Carey, et al., "The Dielectric Constant and Oil Analysis", Practicing Oil Analysis Magazine, Sep. 2001, 7 pages.

William L. Marshall, "Dielectric Constant of Liquids (Fluids) Shown to be Simple Fundamental Relation of Density over Extreme Ranges from −50° to +600° C, Believed Universal", Nov. 5, 2008, 22 pages.

Maciej Zdanowski, et al., "Research on the electrostatic properties of liquid dielectric mixtures", Journal of Electrostatics 65 (2007), p. 506-510.

Viswanalh Ganapathy, "System and Method for Detecting Adulteration of Fuel or Other Material Using Wireless Measurements", U.S. Appl. No. 12/473,156, filed May 27, 2009.

* cited by examiner

US 7,891,229 B2

METHOD AND APPARATUS FOR REAL-TIME CALIBRATION OF A LIQUID STORAGE TANK LEVEL GAUGE

TECHNICAL FIELD

This disclosure relates generally to a level gauge for a liquid storage tank and more specifically to a method and apparatus for real-time calibration of a liquid storage tank level gauge.

BACKGROUND

In a liquid storage tank such as those used for bulk storage of liquefied natural gas, liquefied petroleum gas, ethanol, hydrocarbons, or other liquids, a radar gauge is often used to measure the level of liquid in the tank. Such gauges are typically not sufficiently accurate to satisfy the requirements of Weights & Measures regulatory bodies for custody transfer of some types of liquids.

SUMMARY

This disclosure provides a method and apparatus for real-time calibration of a liquid storage tank level gauge.

In a first embodiment, a method includes receiving a signal that represents a reflection of an electromagnetic wave from a liquid and one or more reference pins in a storage tank. The method also includes calculating from the signal a sensed distance to the liquid and one or more sensed distances to the reference pins, and comparing the sensed distances to the reference pins to one or more reference distances. The method further includes calculating a correction factor based on the comparison of the sensed distances and the reference distances and calculating a corrected distance to the liquid based on the correction factor and the sensed distance to the liquid.

In particular embodiments, the method also includes, while the storage tank is empty, obtaining a reference signal representing a reflection of an electromagnetic wave from the one or more reference pins in the storage tank. In such embodiments, the method further includes calculating from the reference signal one or more reference sensed distances to the reference pins and storing the reference sensed distances as the reference distances.

In a second embodiment, an apparatus includes a transmitter, a receiver, and a controller. The controller is adapted to transmit via the transmitter an electromagnetic wave and receive via the receiver a signal representing a reflection of the electromagnetic wave from a liquid and one or more reference pins in a storage tank. The controller is also adapted to calculate from the signal a sensed distance to the liquid and one or more sensed distances to the reference pins, and compare the sensed distances to the reference pins to one or more reference distances. The controller is further adapted to calculate a correction factor based on the comparison of the sensed distances and the reference distances, and calculate a corrected distance to the liquid based on the correction factor and the sensed distance to the liquid.

In a third embodiment, a system includes a storage tank for liquids, an apparatus supporting one or more reference pins at predetermined positions within the storage tank, and a level-sensing device mounted to the storage tank. The level-sensing device includes a transmitter, a receiver, and a controller. The controller is adapted to transmit via the transmitter an electromagnetic wave and receive via the receiver a signal representing a reflection of the electromagnetic wave from a liquid and a subset of the reference pins in the storage tank. The controller is also adapted to calculate from the signal a sensed distance to the liquid and one or more sensed distances to the subset of the reference pins, and compare the sensed distances to the subset of the reference pins to one or more reference distances. The controller is further adapted to calculate a correction factor based on the comparison of the sensed distances and the reference distances, and calculate a corrected distance to the liquid based on the correction factor and the sensed distance to the liquid.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
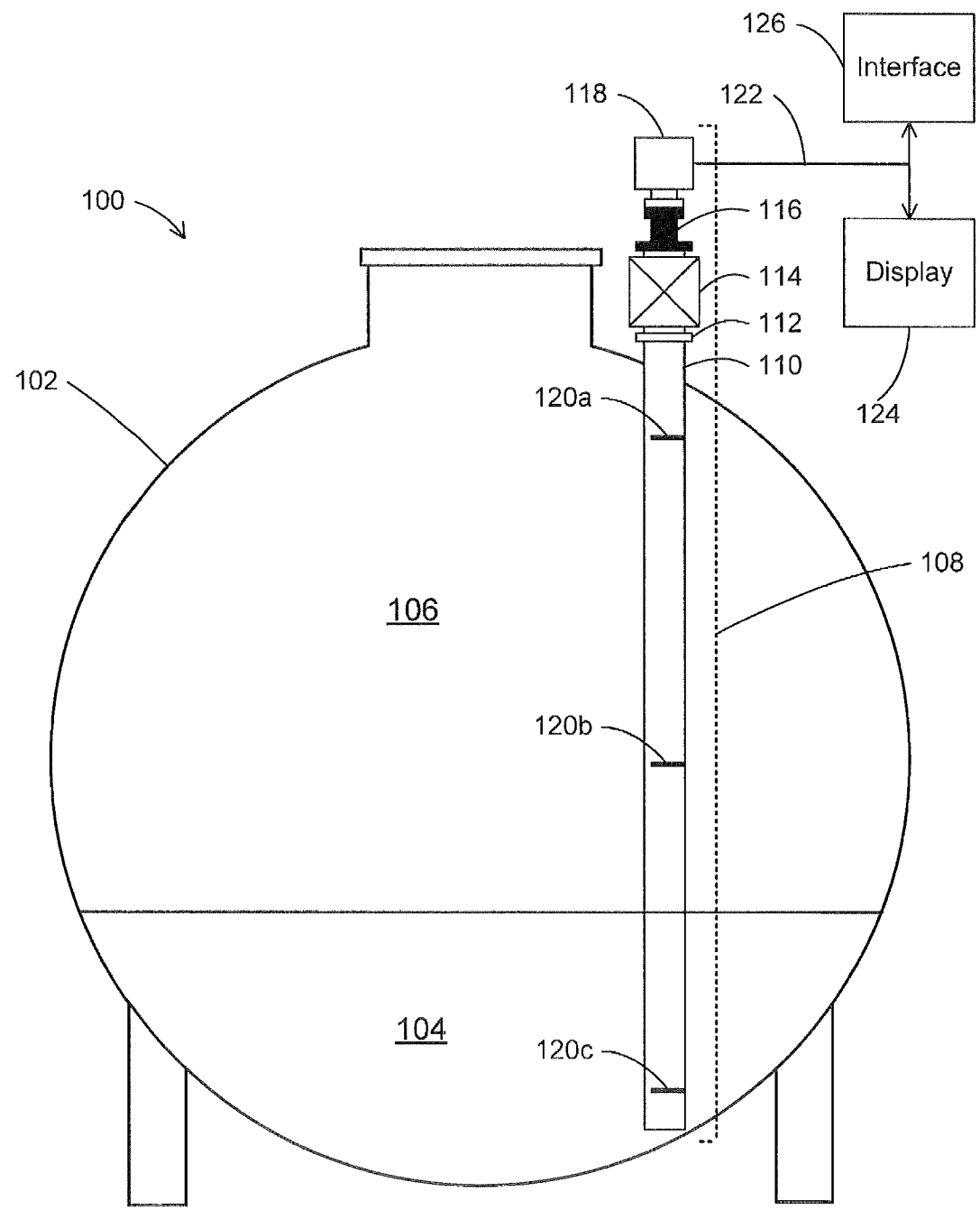
FIG. 1 presents a schematic cutaway view of a liquid storage system with a level-sensing device according to this disclosure.

FIG. 1 presents a schematic cutaway view (not to scale) of a liquid storage system 100 with a level-sensing functionality according to this disclosure. The liquid storage system 100 includes a storage tank 102 suitable for storing a liquid 104. The liquid 104 is stored in some embodiments at high pressure and in other embodiments at low pressure. The portion of the tank 102 above the liquid 104 is typically filled with vapor 106 from the liquid 104. A level-sensing assembly 108 is mounted to the tank 102, in this embodiment extending vertically through an upper portion of a wall of the tank 102.

The level-sensing assembly 108 includes a stillpipe 110, which extends from a reference flange 112 outside the tank 102, through the upper portion of the wall, and to a location near the bottom of the tank 102. The stillpipe 110 is open at its bottom end may have perforations along its length within the tank 102 to permit the liquid 104 to maintain the same level in the stillpipe 110 that is has in the tank 102. The stillpipe 110 is welded or otherwise fixedly mounted and sealed to the tank 102 at the point where the stillpipe 110 passes through the wall of the tank 102. In this way, the reference flange 112 is held in a known position relative to the tank 102.

In an embodiment storing the liquid 104 at a high pressure, the level-sensing assembly 108 further includes a ball valve 114 attached to the reference flange 112, to prevent the liquid 104 or its vapor 106 from being forced out of the tank 102 through the stillpipe 110 and reference flange 112. The level-sensing assembly 108 also includes a pressure seal 116 mounted to the ball valve 114, and a level-sensing apparatus 118 mounted to the pressure seal 116.

The level-sensing apparatus 118 produces one or more signals on communication link 122 representative of a sensed level of the liquid 104 in the storage tank 102. The communication link 122 may be coupled to a display device 124 to display information relating to the level of the liquid 104. The communication link 122 may additionally or alternatively be coupled to an interface 126 to communicate the signals to a remote display, control system, monitoring system, or other device. The interface 126 may communicate the signals via a network such as the internet or a cellular communication network, via a wireless link, a wired link, or other communication link.

The level-sensing apparatus 118 includes a radar gauge that transmits a radar signal through the pressure seal 116 and the ball valve 114 into the stillpipe 110 and receives a return signal that includes radar echoes from the surface of the liquid 104 in the stillpipe 110. In this way, the radar gauge measures the height of the liquid 104 in the tank 102.

The presence of the vapor 106 in the tank 102 and in the portion of the stillpipe 110 above the level of the liquid 104 changes a speed of propagation of the radar signal, however, and therefore affects the accuracy of such a measurement of the level of the liquid 104 in the tank 102. A number of physical characteristics of the liquid 104 and the tank 102 may affect the physical characteristics of the vapor 106 and its effect on the radar signal, such as the composition of the liquid 104, the pressure of the liquid 104, and the temperature of the liquid 104 and/or the tank 102.

Figure 2:
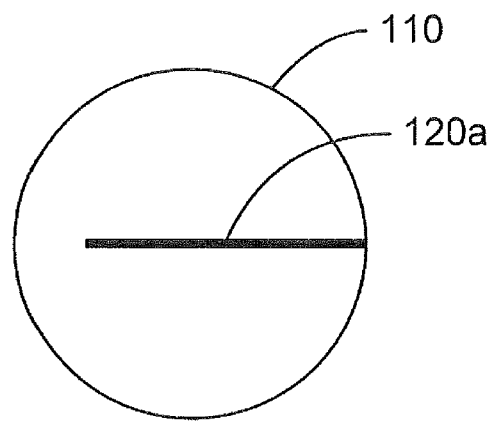
FIG. 2 presents a schematic top view of the stillpipe of FIG. 1.

To estimate the effect of the vapor 106 on the radar signal, reference pins 120a, 120b and 120c may be inserted into the stillpipe 110. FIG. 2 presents a schematic top view of the stillpipe 110 of FIG. 1, showing the reference pin 120a extending partway across a diameter of the stillpipe 110. In FIG. 1, the reference pins 120a-120c are oriented parallel to the plane of the page.

Where the level-sensing apparatus 118 includes a radar gauge having a linearly polarized antenna, the radar gauge may be positioned in a first orientation where the polarization of the antenna is also parallel to the plane of the page and the reference pins 120a-120c produce echoes in the return signal. The radar gauge may be positioned in a second orientation where the polarization of the antenna is perpendicular to the plane of the page and the reference pins 120a-120c do not produce obvious echoes in the return signal.

In such a system, the radar gauge may be positioned in the first orientation and a first trace obtained of the return signal including echoes representing any of the reference pins 120-120c that are located above the surface of the liquid 104. An operator may then examine the first trace and determine an effect on the radar signal of the vapor 106 from known locations of the visible reference pins. The radar gauge may then be positioned in the second orientation and subsequent traces obtained with an echo representing the level of the liquid 104, but without echoes from the reference pins 120a-120c. The effect of the vapor on the radar signal may then be applied to the subsequent measurement traces to correct for the effect of the vapor 106 on the radar signal.

In the level-sensing apparatus 118 of the present disclosure, the radar gauge remains positioned in the first orientation at all times. The return signal in this orientation includes not only echoes representing any of the reference pins 120a-120c that are located above the surface of the liquid 104, the return signal also includes an echo representing the surface of the liquid 104. By comparing the pin echoes in the return signal with pin echoes in a signal previously obtained when the tank 102 was empty, the apparatus 118 is able to calculate a real-time measure of the effect of the vapor 106 on the radar signal. The apparatus 118 is then able to apply a resulting correction factor to the echo in the return signal representing the surface of the liquid 104 in order to obtain a liquid surface distance measurement corrected for current conditions in the tank 102.

Figure 3:
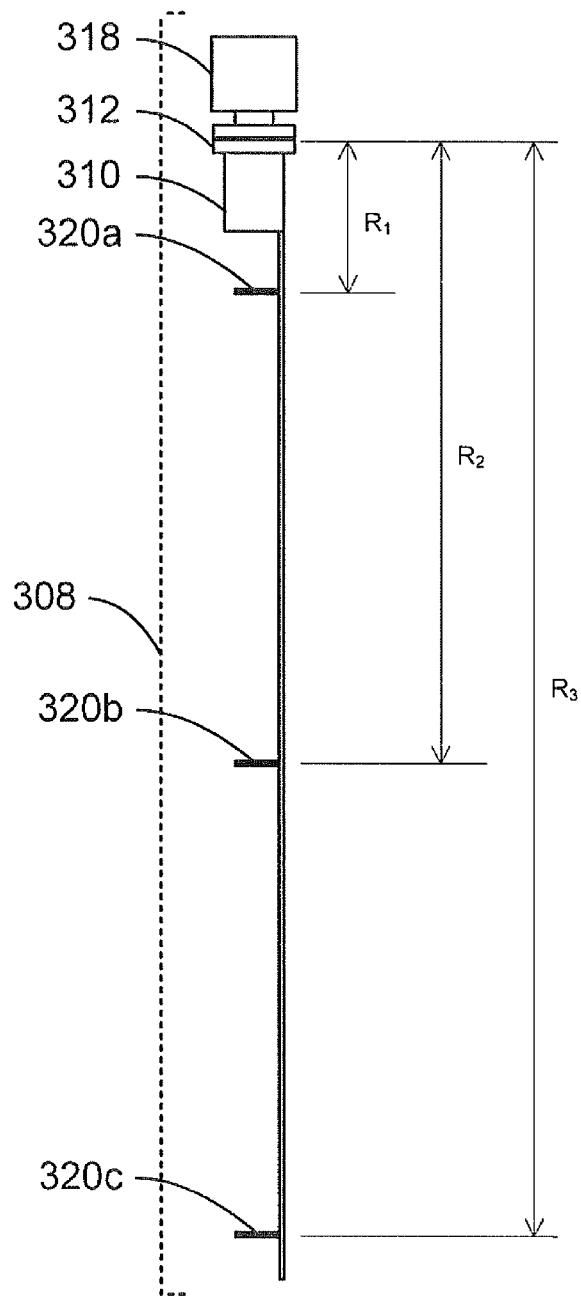
FIG. 3 presents a schematic side view of a second level-sensing assembly according to this disclosure.

FIG. 3 presents a schematic side view of a second level-sensing assembly 308 according to this disclosure. The assembly 308 may be used in low pressure or unpressurized tanks or tanks without a stillpipe. Because the liquid in such a tank is at low pressure or atmospheric pressure, the ball valve 114 and pressure flange 116 of the level-sensing assembly 108 are not needed in the level-sensing assembly 308.

The level-sensing assembly 308 includes a level-sensing apparatus 118 mounted via a reference flange 312 to a collar 310. The collar 310 has a length sufficient to extend through an upper wall of a storage tank and a short distance into the interior of the tank. As described for the stillpipe 110, the collar 310 is welded or otherwise fixedly mounted and sealed to the tank 102 at the point where the stillpipe 110 passes through the wall of the tank 102 and holds the reference flange 312 in a known position relative to the tank. Attached to the collar 310 is a rod 322 that extends vertically into the tank and holds reference pins 320a, 320b, and 320c.

Once the collar 310 is mounted to the tank, the reference pins 320a-320c (like the reference pins 120a-120c in FIG. 1) are also held in known positions relative to the tank. The reference pins 320a, 320b, and 320c are positioned at distances $R_1$, $R_2$ and $R_3$ (respectively) from the reference flange 312.

As described for the level-sensing assembly 108 in FIG. 1, the level-sensing apparatus 318 operates to detect current sensed positions of reference pins 320a-320c that are located above the surface of the liquid, compare the current sensed pin positions with sensed pin positions obtained when the tank was empty, and calculate a correction factor to use in obtaining a liquid surface distance measurement corrected for current conditions in the tank.

Both the level-sensing assembly 108 and the level-sensing assembly 308 correct not only for the effect of vapor in the tank on a radar signal, but also for expansion and contraction of the tank with temperature changes. As the ambient temperature of the tank drops, the tank and level-sensing assemblies according to the present disclosure both contract. As the ambient temperature of the tank rises, the tank and the level-sensing assemblies both expand. Because the position of reference pins is sensed at the same time as the level of the liquid, a level-sensing assembly according to the present disclosure is operable to correct for both the effect of vapor in the tank on a radar signal, as well as for expansion and contraction with temperature changes.

While the level-sensing apparatus 118 and the level-sensing apparatus 318 are described herein as including radar gauges, it will be understood that in other embodiments of the disclosure other types of range finding gauges may be used employing other types of electromagnetic waves. Furthermore, while the level-sensing assembly 108 and the level-sensing assembly 308 include three reference pins, it will be understood that in other embodiments, any number of reference pins may be used.

Figure 4:
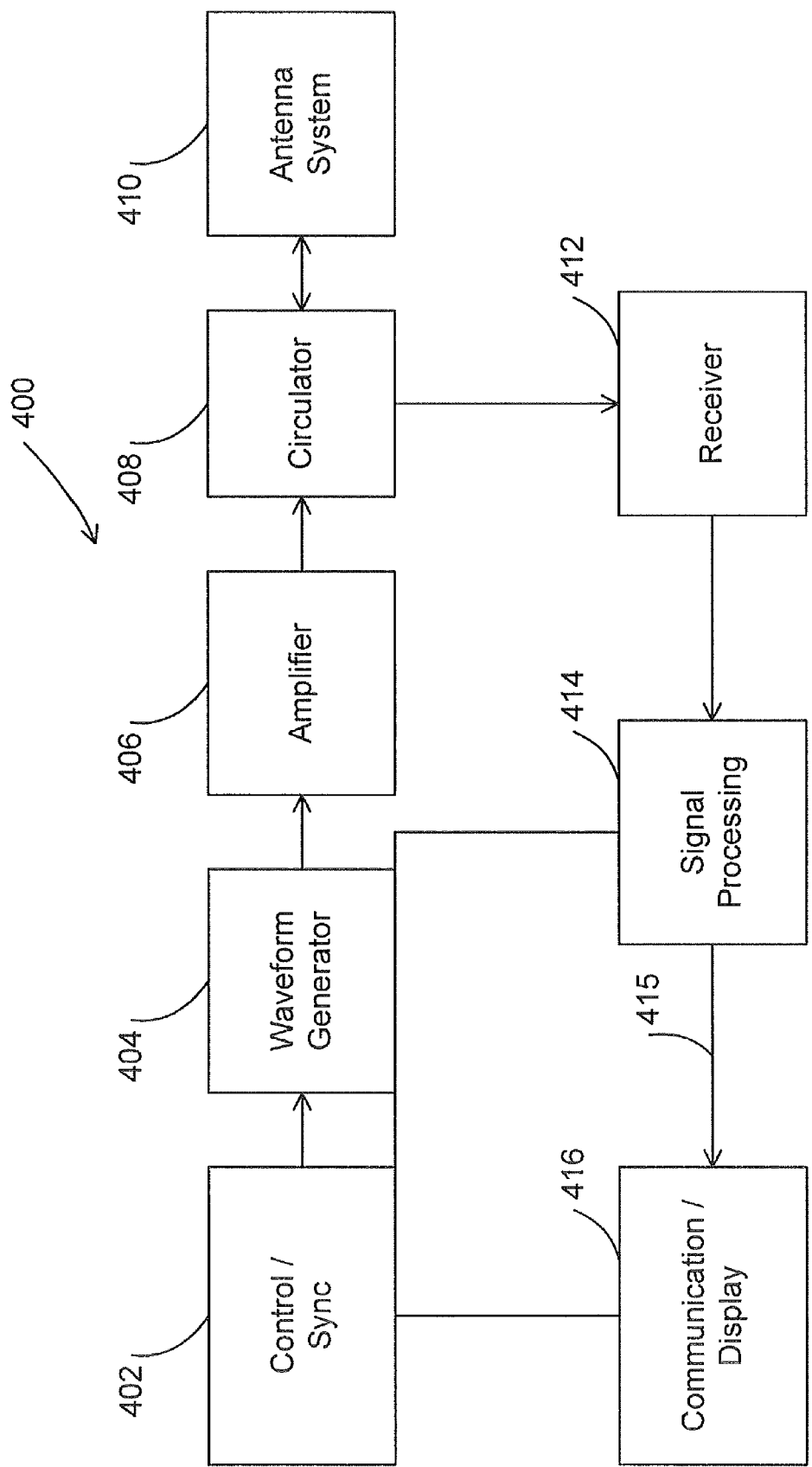
FIG. 4 presents a block diagram of a level-sensing apparatus according to this disclosure.

FIG. 4 presents a block diagram of a level-sensing apparatus 400 according to this disclosure. The apparatus 400 includes a controller 402 that operates a waveform generator 404 to generate a signal for use in range finding. The signal is amplified by an amplifier 406 and is routed through a circulator 408 or other type of device that separates the transmitting and receiving channels, to an antenna system 410. The antenna system 410 transmits the signal as an electromagnetic wave. The antenna system 410 also receives a return signal that includes echoes from objects illuminated by the electromagnetic wave. The return signal is routed through the circulator 408 to a receiver 412. The receiver 412 converts the signal from the antenna system 410 into a signal usable by a signal processing unit 414. The signal processing unit, under the control of and in cooperation with the controller 402, performs a process according to this disclosure to produce a signal 415 representative of a corrected sensed level of liquid in a storage tank. The signal 415 is coupled to an interface 416 for communication to a display or a further communication interface, as described for the level-sensing apparatus 118 of FIG. 1.

Figure 5:
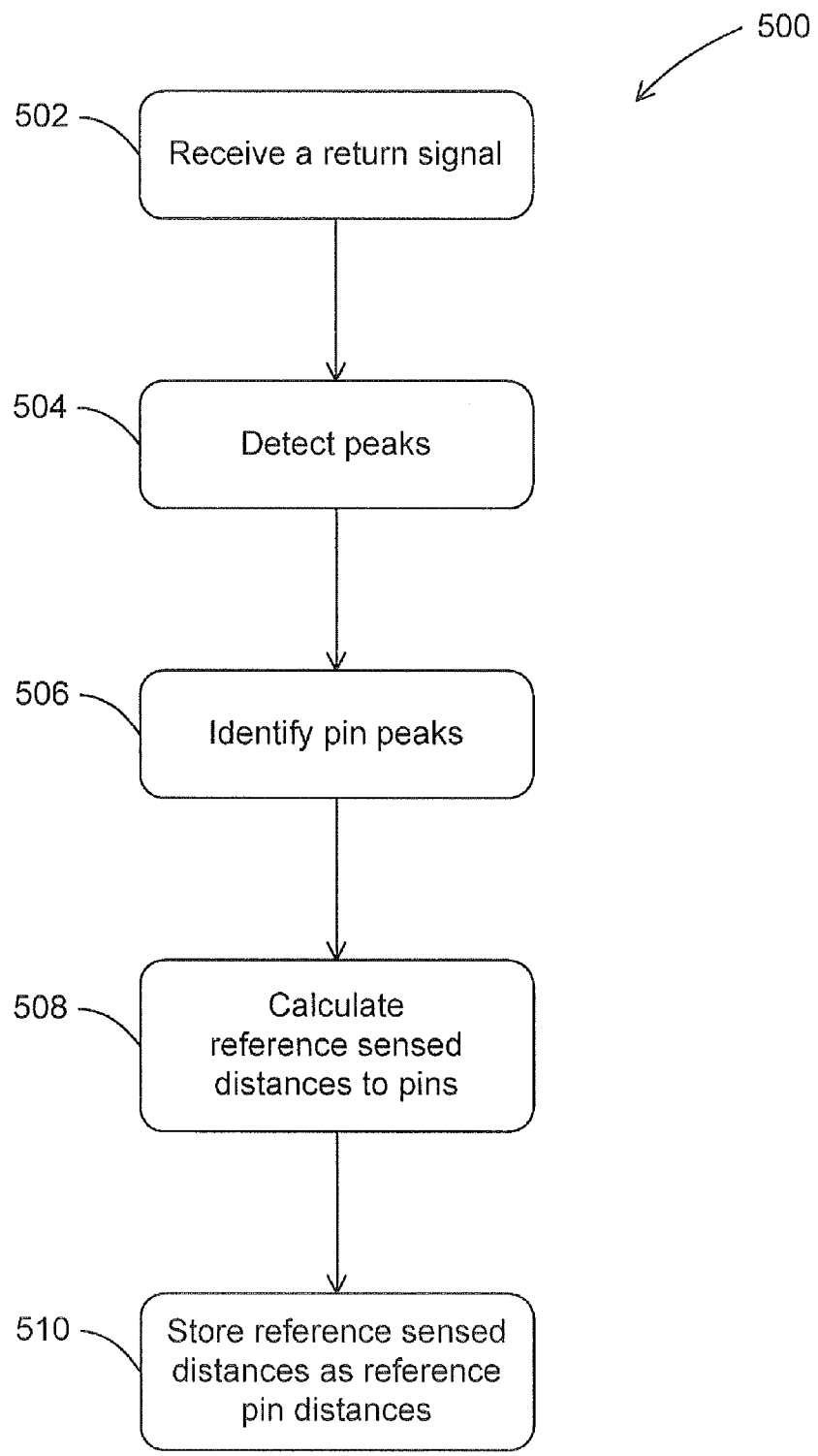
FIG. 5 presents a flow chart of a process for calibrating a level-sensing apparatus according to this disclosure.

FIG. 5 presents a flow chart of a process 500 for calibrating a level-sensing apparatus according to this disclosure. The process 500 is performed in an empty tank at a known temperature.

In step 502, the level-sensing apparatus transmits an electromagnetic wave and receives a return signal that includes echoes from objects in the path of the electromagnetic wave, including reference pins. The return signal provides a measurement of positions of the objects. In step 504, the process detects peaks in the return signal, where the peaks represent the objects creating echoes in the return signal. In step 506, peaks representing the reference pins are identified and, in step 508, reference sensed distances to the pins are calculated. In step 510, the reference sensed distances are stored as reference pin distances for use in the process of calculating a corrected distance to a liquid shown in FIG. 6.

Because the process 500 is performed in an empty tank, there is no vapor present to affect the propagation of the electromagnetic wave. Because the process 500 is performed at a known temperature, the actual positions of the reference pins of the level-sensing apparatus are known to a high degree of accuracy.

Amplitudes of echoes from reference pins in the return signal are dependent upon the length of the pins, among other factors. The length of reference pins in a level-sensing assembly according to this disclosure is selected to provide an echo that is sufficiently higher amplitude than a noise background level of the return signal to permit identification of the peaks representing the reference pins. The technique used in step 504 to detect peaks and in step 506 to identify the reference pin peaks will determine how much higher than the background noise the echo from the reference pins must be.

Figure 6:
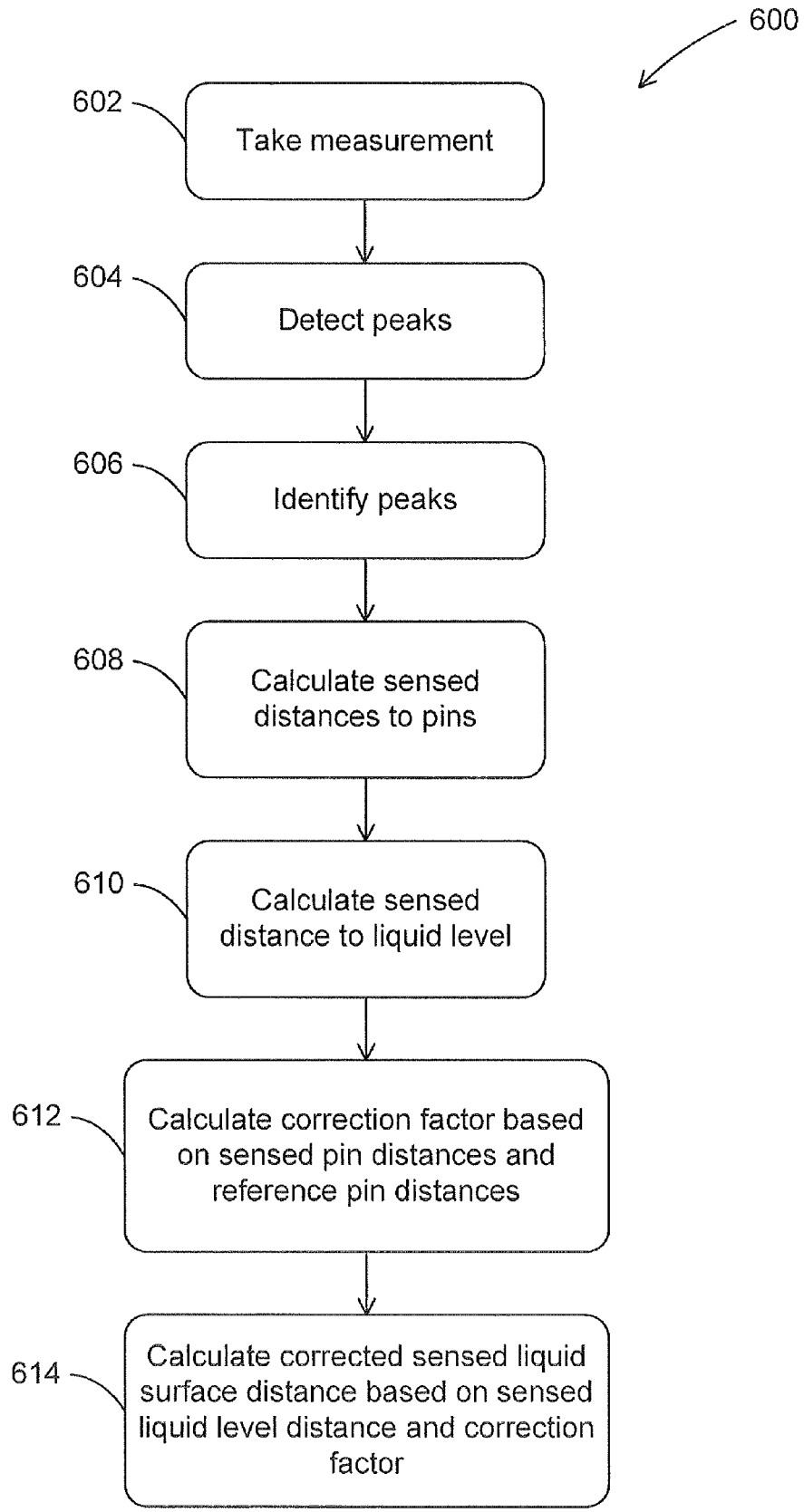
FIG. 6 presents a flow chart of a process for calculating a corrected distance to a liquid surface using a level-sensing apparatus according to this disclosure.

FIG. 6 presents a flow chart of a process 600 for calculating a corrected distance to a liquid surface using a level-sensing apparatus according to this disclosure. The process 600 is performed in a storage tank that is partially filled with liquid and having a vapor in the portion of the tank above the surface of the liquid, as described for tank 102, liquid 104 and vapor 106 in FIG. 1.

In step 602, the level-sensing apparatus transmits an electromagnetic wave and receives a return signal that includes echoes from objects in the path of the electromagnetic wave, including the surface of the liquid and any reference pins that are above the surface of the liquid (so-called "visible" pins). The return signal provides a measurement of positions of the objects. In step 604, the process detects peaks in the return signal, where the peaks represent the objects creating echoes in the return signal.

In step 606, peaks representing the "visible" pins and the liquid surface are identified. In step 608, sensed distances to the "visible" pins are calculated. In step 610, a sensed distance to the liquid surface is calculated.

In addition to the criteria discussed with reference to FIG. 5 for selecting the length of the reference pins in a level-sensing assembly according to this disclosure, the length is further selected so that peaks representing the reference pins are lower in amplitude than the peak representing the liquid surface. In this way, the echo from the liquid surface and the echoes from the visible pins may be differentiated when identifying their respective peaks in step 606. As discussed with reference to FIG. 5, the technique used in step 604 to detect peaks and in step 606 to identify the pin peaks will determine how much lower in amplitude the echo from the reference pins must be than the peak representing the liquid surface in order to be reliably detected and identified.

In step 612, a correction factor is calculated based upon the sensed distances of the "visible" pins calculated in step 608 and the reference pin distances stored in process 500. A visible pin that is closest to the liquid surface may be selected, in order to correct for a large portion of the vapor present between the level-sensing apparatus and the liquid surface. The reference sensed position of the selected pin in then divided by the current sensed position of the selected pin to calculate a correction factor representative of the current vapor and temperature conditions in the storage tank. In other embodiments of the disclosure, other criteria may be used to select one or more visible pins to use in calculating a correction factor in step 612.

In step 614, a corrected sensed liquid distance is calculated based on the sensed distance to the liquid surface calculated in step 610 and the correction factor calculated in step 612. The sensed liquid surface distance in multiplied by the correction factor to calculate the corrected sensed liquid distance.

It may be advantageous to set forth definitions of certain words and phrases used throughout this patent document. The term "couple" and its derivatives refer to any direct or indirect communication between two or more elements, whether or not those elements are in physical contact with one another. The terms "over," "above," and the like denote relative positions of two or more elements in a particular orientation and do not require direct contact between the elements. The terms "include" and "comprise," as well as derivatives thereof, mean inclusion without limitation. The term "or" is inclusive, meaning and/or.

The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a signal representing reflections of an electromagnetic wave from a liquid and one or more reference pins in a storage tank;
   calculating from the signal a first sensed distance to the liquid and one or more second sensed distances to the one or more reference pins;
   comparing the one or more second sensed distances to one or more reference distances;
   calculating a correction factor based on the comparison of the one or more second sensed distances and the one or more reference distances; and
   calculating a corrected distance to the liquid based on the correction factor and the first sensed distance;
   wherein calculating the first and second sensed distances comprises:
      identifying peaks in the signal corresponding to the reflections from the liquid and from the one or more reference pins; and
      calculating from the identified peaks the first and second sensed distances.

2. The method of claim 1, further comprising:
   while the storage tank is empty, obtaining a reference signal representing one or more reflections of a second electromagnetic wave from the one or more reference pins in the storage tank;
   calculating from the reference signal one or more reference sensed distances to the one or more reference pins; and
   storing the one or more reference sensed distances as the one or more reference distances.

3. The method of claim 1, wherein identifying the peaks in the signal comprises:
   identifying a peak having a highest magnitude in the signal as the peak corresponding to the reflection from the liquid; and
   identifying one or more peaks having next highest magnitudes in the signal as the one or more peaks corresponding to the one or more reference pins.

4. A method comprising:
   receiving a signal representing reflections of an electromagnetic wave from a liquid and one or more reference pins in a storage tank;
   calculating from the signal a first sensed distance to the liquid and one or more second sensed distances to the one or more reference pins;
   comparing the one or more second sensed distances to one or more reference distances;
   calculating a correction factor based on the comparison of the one or more second sensed distances and the one or more reference distances; and
   calculating a corrected distance to the liquid based on the correction factor and the first sensed distance;
   wherein comparing the one or more second sensed distances to the one or more reference distances comprises:
      selecting one of the one or more reference pins; and
      calculating a ratio between (i) the reference distance associated with the selected pin and (ii) the second sensed distance associated with the selected pin.

5. The method of claim 4, wherein selecting one of the one or more reference pins comprises selecting a visible reference pin closest to a surface of the liquid.

6. A method comprising:
   while a storage tank is empty, obtaining a reference signal representing one or more reflections of a first electromagnetic wave from one or more reference pins in the storage tank;
   calculating from the reference signal one or more reference sensed distances to the one or more reference pins;
   storing the one or more reference sensed distances as one or more reference distances;
   receiving a signal representing reflections of a second electromagnetic wave from a liquid and the one or more reference pins in the storage tank;
   calculating from the signal a first sensed distance to the liquid and one or more second sensed distances to the one or more reference pins;
   comparing the one or more second sensed distances to the one or more reference distances;
   calculating a correction factor based on the comparison of the one or more second sensed distances and the one or more reference distances; and
   calculating a corrected distance to the liquid based on the correction factor and the first sensed distance.

7. The method of claim 6, wherein calculating the one or more reference sensed distances comprises:
   identifying one or more peaks in the reference signal corresponding to the one or more reflections from the one or more reference pins; and
   calculating from the one or more identified peaks in the reference signal the one or more reference sensed distances to the one or more reference pins.

8. An apparatus comprising:
   a transmitter;
   a receiver; and
   a controller adapted to:
      transmit via the transmitter an electromagnetic wave;
      receive via the receiver a signal representing reflections of the electromagnetic wave from a liquid and one or more reference pins in a storage tank;
      calculate from the signal a first sensed distance to the liquid and one or more second sensed distances to the one or more reference pins;
      compare the one or more second sensed distances one or more reference distances;
      calculate a correction factor based on the comparison of the one or more second sensed distances and the one or more reference distances; and
      calculate a corrected distance to the liquid based on the correction factor and the first sensed distance;
   wherein the controller is adapted to calculate the first and second sensed distances by:
      identifying peaks in the signal corresponding to the reflections from the liquid and from the one or more reference pins; and
      calculating from the identified peaks the first and second sensed distances.

9. The apparatus of claim 8, wherein the controller is further adapted to:
   while the storage tank is empty, receive via the receiver a reference signal representing one or more reflections of a second electromagnetic wave from the one or more reference pins in the storage tank;
   calculate from the reference signal one or more reference sensed distances to the one or more reference pins; and
   store the one or more reference sensed distances as the one or more reference distances.

10. The apparatus of claim 8, wherein the controller is adapted to identify the peaks in the signal by:
   identifying a peak having a highest magnitude in the signal as the peak corresponding to the reflection from the liquid; and identifying one or more peaks having next highest magnitudes in the signal as the one or more peaks corresponding to the one or more reference pins.

11. An apparatus comprising:
a transmitter;
a receiver; and
a controller adapted to:
  transmit via the transmitter an electromagnetic wave;
  receive via the receiver a signal representing reflections of the electromagnetic wave from a liquid and one or more reference pins in a storage tank;
  calculate from the signal a first sensed distance to the liquid and one or more second sensed distances to the one or more reference pins;
  compare the one or more second sensed distances to one or more reference distances;
  calculate a correction factor based on the comparison of the one or more second sensed distances and the one or more reference distances; and
  calculate a corrected distance to the liquid based on the correction factor and the first sensed distance;
wherein the controller is adapted to compare the one or more second sensed distances to the one or more reference distances by:
  selecting one of the one or more reference pins; and
  calculating a ratio between (i) the reference distance associated with the selected pin and (ii) the second sensed distance associated with the selected pin.

12. The apparatus of claim 11, wherein the controller is adapted to select one of the one or more reference pins by selecting a visible reference pin closest to a surface of the liquid.

13. An apparatus comprising:
a transmitter;
a receiver; and
a controller adapted to:
  while a storage tank is empty, transmit via the transmitter a first electromagnetic wave and receive via the receiver a reference signal representing one or more reflections of the first electromagnetic wave from one or more reference pins in the storage tank;
  calculate from the reference signal one or more reference sensed distances to the one or more reference pins;
  store the one or more reference sensed distances as one or more reference distances;
  transmit via the transmitter a second electromagnetic wave;
  receive via the receiver a signal representing reflections of the second electromagnetic wave from a liquid and the one or more reference pins in the storage tank;
  calculate from the signal a first sensed distance to the liquid and one or more second sensed distances to the one or more reference pins;
  compare the one or more second sensed distances to the one or more reference distances;
  calculate a correction factor based on the comparison of the one or more second sensed distances and the one or more reference distances; and
  calculate a corrected distance to the liquid based on the correction factor and the first sensed distance.

14. The apparatus of claim 13, wherein the controller is adapted to calculate the one or more reference sensed distances by:
  identifying one or more peaks in the reference signal corresponding to the one or more reflections from the one or more reference pins; and
  calculating from the one or more identified peaks in the reference signal the one or more reference sensed distances to the one or more reference pins.

15. A system comprising:
a storage tank adapted to store a liquid;
an apparatus adapted to support one or more reference pins at one or more specified positions within the storage tank; and
a level-sensing device comprising:
  a transmitter;
  a receiver; and
  a controller adapted to:
    transmit via the transmitter an electromagnetic wave;
    receive via the receiver a signal representing reflections of the electromagnetic wave from the liquid and at least one of the one or more reference pins in the storage tank;
    calculate from the signal a first sensed distance to the liquid and one or more second sensed distances to the at least one of the one or more reference pins;
    compare the one or more second sensed distances to one or more reference distances;
    calculate a correction factor based on the comparison of the one or more second sensed distances and the one or more reference distances; and
    calculate a corrected distance to the liquid based on the correction factor and the first sensed distance;
  wherein the controller is adapted to calculate the first and second sensed distances by:
    identifying peaks in the signal corresponding to the reflections from the liquid and from the at least one of the one or more reference pins; and
    calculating from the identified peaks the first and second sensed distances.

16. The system of claim 15, wherein the controller is further adapted to:
  while the storage tank is empty, receive via the receiver a reference signal representing one or more reflections of a second electromagnetic wave from the one or more reference pins in the storage tank;
  calculate from the reference signal one or more reference sensed distances to the one or more reference pins; and
  store the one or more reference sensed distances as the one or more reference distances.

17. The system of claim 15, wherein the controller is adapted to identify the peaks in the signal by:
  identifying a peak having a highest magnitude in the signal as the peak corresponding to the reflection from the liquid; and
  identifying one or more peaks having next highest magnitudes in the signal as the one or more peaks corresponding to the at least one of the one or more reference pins.

18. A system comprising:
a storage tank adapted to store a liquid;
an apparatus adapted to support one or more reference pins at one or more specified positions within the storage tank; and
a level-sensing device comprising:
  a transmitter;
  a receiver; and
  a controller adapted to:
    transmit via the transmitter an electromagnetic wave;
    receive via the receiver a signal representing reflections of the electromagnetic wave from the liquid and at least one of the one or more reference pins in the storage tank;

calculate from the signal a first sensed distance to the liquid and one or more second sensed distances to the at least one of the one or more reference pins;

compare the one or more second sensed distances to one or more reference distances;

calculate a correction factor based on the comparison of the one or more second sensed distances and the one or more reference distances; and calculate a corrected distance to the liquid based on the correction factor and the first sensed distance;

wherein the controller is adapted to compare the one or more second sensed distances to the one or more reference distances by:

selecting one of the one or more reference pins; and calculating a ratio between (i) the reference distance associated with the selected pin and (ii) the second sensed distance associated with the selected pin.

19. The system of claim 18, wherein the controller is adapted to select one of the subset of the one or more reference pins by selecting a visible reference pin closest to a surface of the liquid.

20. A system comprising:

a storage tank adapted to store a liquid;

an apparatus adapted to support one or more reference pins at one or more specified positions within the storage tank; and a level-sensing device comprising:

a transmitter;

a receiver; and a controller adapted to:

while the storage tank is empty, transmit via the transmitter a first electromagnetic wave and receive via the receiver a reference signal representing one or more reflections of the first electromagnetic wave from the one or more reference pins in the storage tank;

calculate from the reference signal one or more reference sensed distances to the one or more reference pins;

store the one or more reference sensed distances as one or more reference distances;

transmit via the transmitter a second electromagnetic wave;

receive via the receiver a signal representing reflections of the second electromagnetic wave from a liquid and at least one of the one or more reference pins in the storage tank;

calculate from the signal a first sensed distance to the liquid and one or more second sensed distances to the at least one of the one or more reference pins;

compare the one or more second sensed distances to the one or more reference distances;

calculate a correction factor based on the comparison of the one or more second sensed distances and the one or more reference distances; and calculate a corrected distance to the liquid based on the correction factor and the first sensed distance.

21. The system of claim 20, wherein the controller is adapted to calculate the reference sensed distances by:

identifying one or more peaks in the reference signal corresponding to the one or more reflections from the one or more reference pins; and calculating from the one or more identified peaks in the reference signal the one or more reference sensed distances to the one or more reference pins.

\* \* \* \* \*